A. MASCHKA.
Grain-Drill.
No 41,713.  Patented Feb. 23 1864.
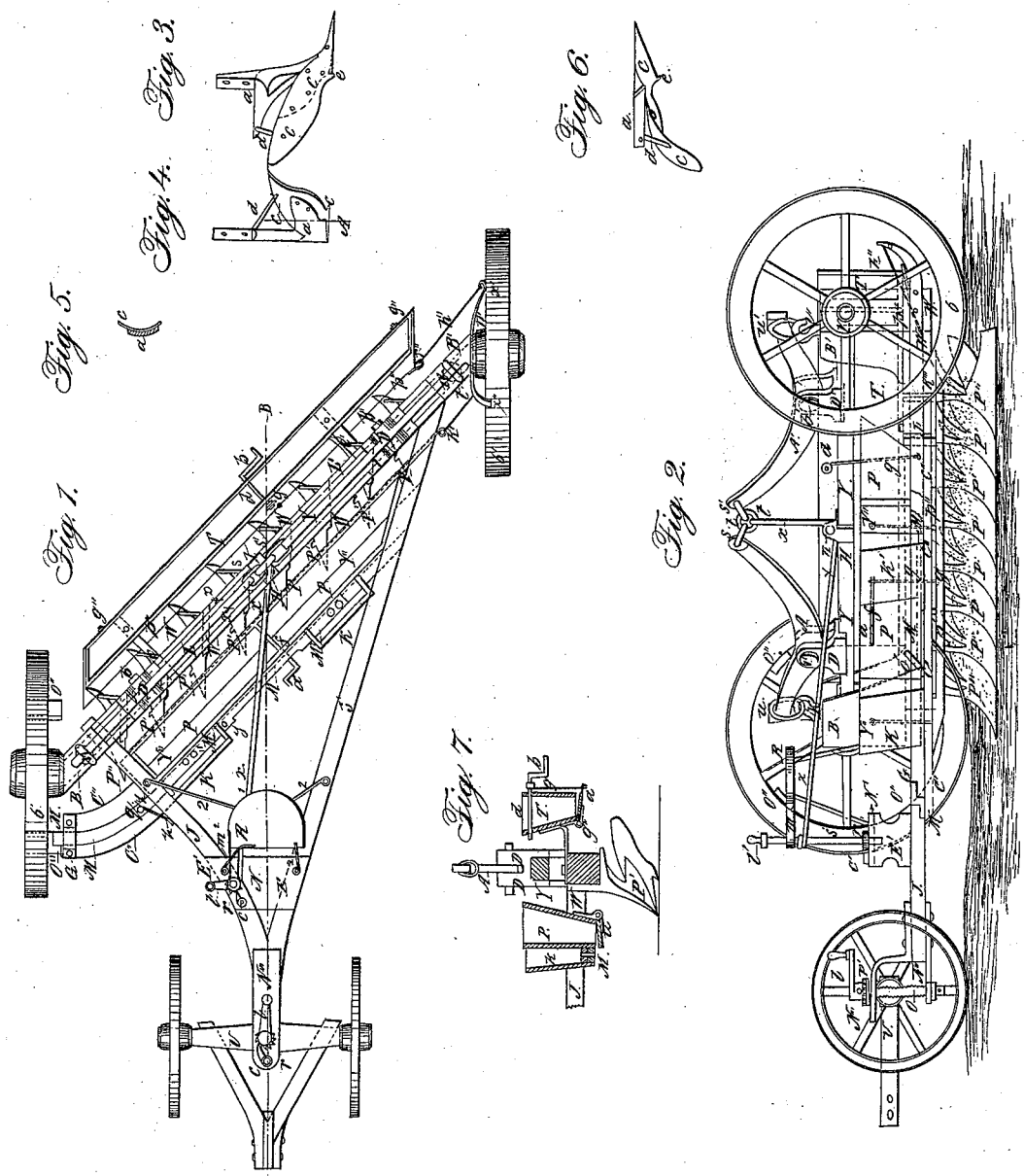
Witnesses:

UNITED STATES PATENT OFFICE.

ANTON MASCHKA, OF CHICAGO, ILLINOIS.

IMPROVEMENT IN GRAIN-DRILLS.

Specification forming part of Letters Patent No. 41,713, dated February 23, 1864.

*To all whom it may concern:*

Be it known that I, ANTON MASCHKA, of Chicago, in the county of Cook and State of Illinois, have invented certain new and useful Improvements in Seeding-Machines; and I do hereby declare that the following is a full, clear, and exact description of the construction and operation of the same, reference being had to the accompanying drawings, in which—

Figure 1 represents a top view of said machine. Fig. 2 represents a side view of the same. Figs. 3, 4, 5, and 6 represent detached views of the plow for covering the seed. Fig. 7 represents a vertical cross-section through the seed-boxes and the frame of the machine.

To enable others skilled in the art to make and use my invention, I will proceed to describe its construction and operation.

Y represents the axle, which is supported by the main driving-wheels 6 and 6' of the machine, as said axle, as well as the operating parts of the machine, stands obliquely on the line of motion of the machine, for reasons hereinafter explained. The ends of the axle are bent to the desired angle, so that the driving-wheels may be set thereon in their proper position.

J, J', and W represent the frame of the machine. The part W is under and parallel to the axle Y, and the rear ends of J and J' are secured to it, while their front ends are secured to the couplings N'' and N''', which connect them with the front truck, V, of the machine. The ends of the frame-piece W are provided with guide-flanges B and B', which extend upward to both sides of the axle Y and serve to guide the frame perpendicularly when it is raised or lowered. A and A' are levers, which are pivoted at $b'$ $b''$ to the brackets D and D' of the axle Y. The outer short arms are connected with the flanges B and B' by means of ring $u$ and hook $v$. A rope, $x$, is secured to the inner and longer arms of said levers by means of the rings $s$ and $t$. The rope $x$ passes around a staple or pulley, $n$, and thence to the crank-shaft $s'$, and by turning said shaft the beam W, seed-boxes, and plows are raised and lowered at pleasure. The front end of the machine, which is connected with the truck V, is raised or lowered by operating the screw-shaft O.

P and T represent seed-boxes, which are secured respectively to the front and to the rear of the beam W, while the plows P', which cover the seed, are secured to the lower side of the said beam. The seed-boxes, as well as said plows, are arranged in an oblique position toward the line of motion of the machine, so as to prevent the plows from becoming chocked in their operation, and for the purpose of scattering the seed with great uniformity over the ground, as will be seen by the particular construction of the seed-boxes. In these the bottom $a$ is hinged to the side of the box by means of the hinges $g''$, and can open downward on said hinges. It is held closed by means of the cord $g$, which passes around the crank-shaft $d$, and by which the width of the aperture through which the grain escapes can be adjusted. The edge of the bottom $a$ is connected with the spring-cam $n''$ by means of the rod $h''$, and said springs extend to within the spokes of the wheel 6'. When the wheel revolves it causes the bottom $a$ to vibrate, and thus to discharge the grain. It is obvious that in setting the seed-box obliquely on the line of motion of the machine the edge over which the seed drops from the box is longer than the breadth sown, and more grains of seed will pass over it than when said edge is at right angles to the line of motion. I am thus enabled to use a very small aperture for the escape of seed and still sow a sufficient quantity, and thus to regulate the quantity to be sown with a greater nicety than it can be done where a seed-box set at right angles is used.

It is well known that in seasons where extraordinary cold, drought, rain, or other bad influences prevail crops are destroyed for being planted too deep or too shallow, and as it is impossible to forsee such contingences the raising of full crops is more or less hazardous. To better insure a full crop I plant my grain at various depths, some deep and some shallow, and although I may use more seed in this process than by planting at a certain depth only, I am fully remunerated for the additional expense of seed by an almost sure full crop. For this purpose I provide my seeding apparatus with two seed-boxes, one in front of the covering-plows P' and one in the rear of the same. The seed which escapes from the front box, P, is covered to the desired depth by the succeeding covering-plows P', while the seed which drops from the rear box, T, remains on the surface, and is covered lightly by a harrow, which may be attached to the rear of the machine. Thus I plant the seed at various depths, and insure the germination and preservation of the greater part of them, and under any circumstances prevent the destruction of the crop, as it frequently occurs if the season should prove an extraordinary one in respect to cold, rain, drought, or other bad influences, which tend to destroy the crops which are planted shallow or deep throughout.

By disconnecting one of the seed-dropping devices from the gearing, and by thus using one seed-box only the grain may be planted at a certain depth, if such should be found desirable for certain crops and localities.

K and K' are seed-boxes, which are secured in front of the box P. They are provided with seed-slides M and M', which are operated by means of the cams O'' on the driving-wheel 6. The seed-slides are provided with seed-cells for dropping corn, and thus the machine may be used for planting corn as well as grain.

Having thus fully described the nature of my invention, what I claim herein as new, and desire to secure by Letters Patent, is—

In combination with the double oblique seed-boxes P T, arranged respectively in front and in the rear of the seed-covers, the levers A A', rope $x$, and crank-shaft $s'$, for the purpose of planting the grain at various depths, and for adjusting the depths of the seed-coverers P', substantially in the manner herein described.

ANTON MASCHKA.

Witnesses:
 PETER H. WITT,
 WM. M. DOUGLASS.